(12) United States Patent
Watanabe et al.

(10) Patent No.: US 8,144,230 B2
(45) Date of Patent: Mar. 27, 2012

(54) CAMERA, STORAGE MEDIUM HAVING STORED THEREIN CAMERA CONTROL PROGRAM, AND CAMERA CONTROL METHOD

(75) Inventors: Makoto Watanabe, Chiba (JP); Yosuke Magaki, Chiba (JP); Sachiko Nakazawa, Chiba (JP); Yuichi Onumata, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 371 days.

(21) Appl. No.: 12/473,511

(22) Filed: May 28, 2009

(65) Prior Publication Data
US 2009/0237548 A1 Sep. 24, 2009

(30) Foreign Application Priority Data

Jun. 2, 2008 (JP) .................................. 2008-144083

(51) Int. Cl.
*H04N 5/222* (2006.01)

(52) U.S. Cl. .................................. 348/333.02; 348/362

(58) Field of Classification Search .................. None
See application file for complete search history.

(56) References Cited

U.S. PATENT DOCUMENTS

| 5,915,133 | A | 6/1999 | Hirai et al. |
| 5,923,908 | A | 7/1999 | Schrock et al. |
| 6,614,996 | B2 | 9/2003 | Okisu et al. |
| 7,417,679 | B2 | 8/2008 | Kuruma |
| 2002/0196357 | A1* | 12/2002 | Battles et al. ............ 348/333.01 |
| 2003/0026607 | A1 | 2/2003 | Okisu et al. |
| 2003/0052881 | A1* | 3/2003 | Otagiri .......................... 345/440 |
| 2003/0122933 | A1* | 7/2003 | Shiohara ..................... 348/207.2 |
| 2006/0072028 | A1 | 4/2006 | Hong |
| 2006/0093346 | A1* | 5/2006 | Ishiyama ....................... 396/287 |

FOREIGN PATENT DOCUMENTS

| JP | 6-194714 A | 7/1994 |
| JP | 9-281541 A | 10/1997 |
| JP | 10-161174 A | 6/1998 |

(Continued)

OTHER PUBLICATIONS

Extended European Search Report dated Oct. 2, 2009 (8 pages), issued in counterpart European Application Serial No. 09160954.5.

(Continued)

*Primary Examiner* — Lin Ye
*Assistant Examiner* — Dennis Hogue
(74) *Attorney, Agent, or Firm* — Holtz, Holtz, Goodman & Chick, PC

(57) ABSTRACT

A graph 261, in which "aperture" is configured on the vertical axis, and "shutter speed" is configured on the horizontal axis, is displayed as superimposed on a through image. On this displayed graph 261, at a position of a parameter value corresponding to a determined photographic scene, an icon 262 of the photographic scene is displayed. When the icon 262 is operated and moved by a user, the display of the icon 262 is changed to a position on the graph 261 where the icon 262 is operated and moved, and values of the vertical axis and the horizontal axis are read off and the corresponding parameter stored in a RAM is updated. When the shutter key is operated, photographic processing is carried out with parameters stored in the RAM, and image data obtained by this photographic processing is recorded in the storage memory.

9 Claims, 9 Drawing Sheets

FOREIGN PATENT DOCUMENTS

| | | | |
|---|---|---|---|
| JP | 10-161175 A | | 6/1998 |
| JP | 2003-018433 A | | 1/2003 |
| JP | 2003-344891 A | | 12/2003 |
| JP | 2005-229209 A | | 8/2005 |
| JP | 2005229209 A | * | 8/2005 |
| JP | 2006178015 A | * | 7/2006 |
| JP | 2007-019962 A | | 1/2007 |
| JP | 2008-011289 A | | 1/2008 |
| KR | 2005-0032473 A | | 4/2005 |
| KR | 2006-0029353 A | | 4/2006 |

OTHER PUBLICATIONS

Japanese Office Action dated Nov. 30, 2010 (and English translation thereof) in counterpart Japanese Application No. 2008-144083.

Chinese Office Action dated Aug. 12, 2010 (and English translation thereof) in counterpart Chinese Application No. 200910203128.7.

Korean Office Action dated Oct. 26, 2010 (and English translation thereof) in counterpart Korean Application No. 10-2009-0045407.

* cited by examiner

FIG. 2

| PHOTOGRAPHIC SCENE | ICON | | PARAMETER | | | | | |
|---|---|---|---|---|---|---|---|---|
| | | | FOCUS CONTROL | SHUTTER SPEED | APERTURE | EV SHIFT AMOUNT | SENSITIVITY | WHITE BALANCE |
| PERSON | MALE | | A-1 | B-1 | C-1 | D-1 | E-1 | F-1 |
| | FEMALE | | A-2 | B-2 | C-2 | D-2 | E-2 | F-2 |
| | CHILD | | A-3 | B-3 | C-3 | D-3 | E-3 | F-3 |
| ANIMAL | PET | | | | | | | |
| LANDSCAPE | NATURE | | | | | | | |
| | LANDSCAPE | | | | | | | |
| CLOSEUP | MACRO | | | | | | | |
| | CUISINE | | | | | | | |
| | FLOWER | | | | | | | |
| DARK | SUNSET | | | | | | | |
| | DARK | | | | | | | |
| NIGHT SCENE | NIGHT SCENE | | | | | | | |
| MOTION | MOTION | | | | | | | |

221

CAMERA, STORAGE MEDIUM HAVING STORED THEREIN CAMERA CONTROL PROGRAM, AND CAMERA CONTROL METHOD

This application is based on and claims the benefit of priority from Japanese Patent Application No. 2008-144083, filed on 2 Jun. 2008, the content of which is incorporated herein by reference.

BACKGROUND OF THE INVENTION

1. Field of the Invention

The present invention relates to a camera, storage medium having stored therein camera control program, and camera control method for performing photography under set photography conditions.

2. Related Art

Conventionally, a so-called "fully automatic camera" that automatically sets photography conditions and performs photography has been proposed. For example, a full automatic camera disclosed in Japanese Unexamined Patent Application Publication No. 2008-11289 determines a photographic scene based on a subject image obtained from an imaging device, and automatically configures photography conditions (photography node) of the camera according to this determined photographic scene. Therefore, without being inconvenienced with configuration operations for photography conditions, it is possible for a user to perform photography and recording with appropriate photography conditions according to the photographic scene.

However, for fully automatic cameras, while it is possible for a user to perform photography and recording with appropriate photography conditions according to the photographic scene without being inconvenienced with configuration operations for photography conditions, as mentioned above, the intention of the user is entirely unreflected in the photography conditions. Therefore, a demerit arises in that attributes that directly reflect the intention of the user are not imparted to the recorded image at all.

On the other hand, as an extreme opposite to this fully automatic camera, there is provided a manual camera. With the manual camera, photography conditions are all manually configured, and therefore the user's intention is directly reflected in the photography conditions. Therefore, it is possible to impart attributes to the recorded image that directly reflect the intention of the user. However, with the manual camera, since the user himself or herself must assess the photographic scene and manually configure all photography conditions, even though the user's intention is directly reflected in the recorded image, a demerit arises in that the user is inconvenienced with a configuration operation of the photography conditions.

In view of the above-mentioned problem of the prior art, the present invention has been made, and it is an object of the present invention to provide a camera, storage medium having stored therein camera control program, and camera control method capable of solving the demerits of the fully automatic camera and the manual camera together.

SUMMARY OF THE INVENTION

In order to attain the above-mentioned object, a camera according to claim 1 comprising: a determination means for determining a photographic scene based on a photographed subject image; and a display means for displaying a graph relating to photography conditions, as well as displaying a predetermined identifier at a position on the graph corresponding to photography conditions that correspond to a photographic scene determined by the determination means.

Further, a storage medium having stored therein camera control program according to claim 12, causing a computer included in a camera to function as: a determination means for determining a photographic scene based on a photographed subject image; and a display means for displaying a graph relating to photography conditions, as well as displaying a predetermined identifier at a position on the graph corresponding to photography conditions that correspond to a photographic scene determined by the determination means.

A camera control method according to claim 13, comprising: a determination step of determining a photographic scene based on a photographed subject image; and a display step of displaying a graph relating to photography conditions, as well as displaying a predetermined identifier at a position on the graph corresponding to photography conditions that correspond to a photographic scene determined in the determination step.

According to the present invention, since a prescribed identifier is displayed at a position on the graph corresponding to photography conditions that correspond to the determined photographic scene, it is possible for the user easily to set photography conditions manually with reference to a position of the identifier displayed. Therefore, it is possible to solve the demerits of both the fully automatic camera and the manual camera, and there is the advantage of being able to resolve the disadvantages of inconveniencing the user with a configuration operation of photography conditions while reflecting the intention of the user in the photography conditions.

BRIEF DESCRIPTION OF THE DRAWINGS

FIG. 2 is a schematic diagram showing a photographic scene correspondence table;

DETAILED DESCRIPTION OF THE INVENTION

Figure 1:
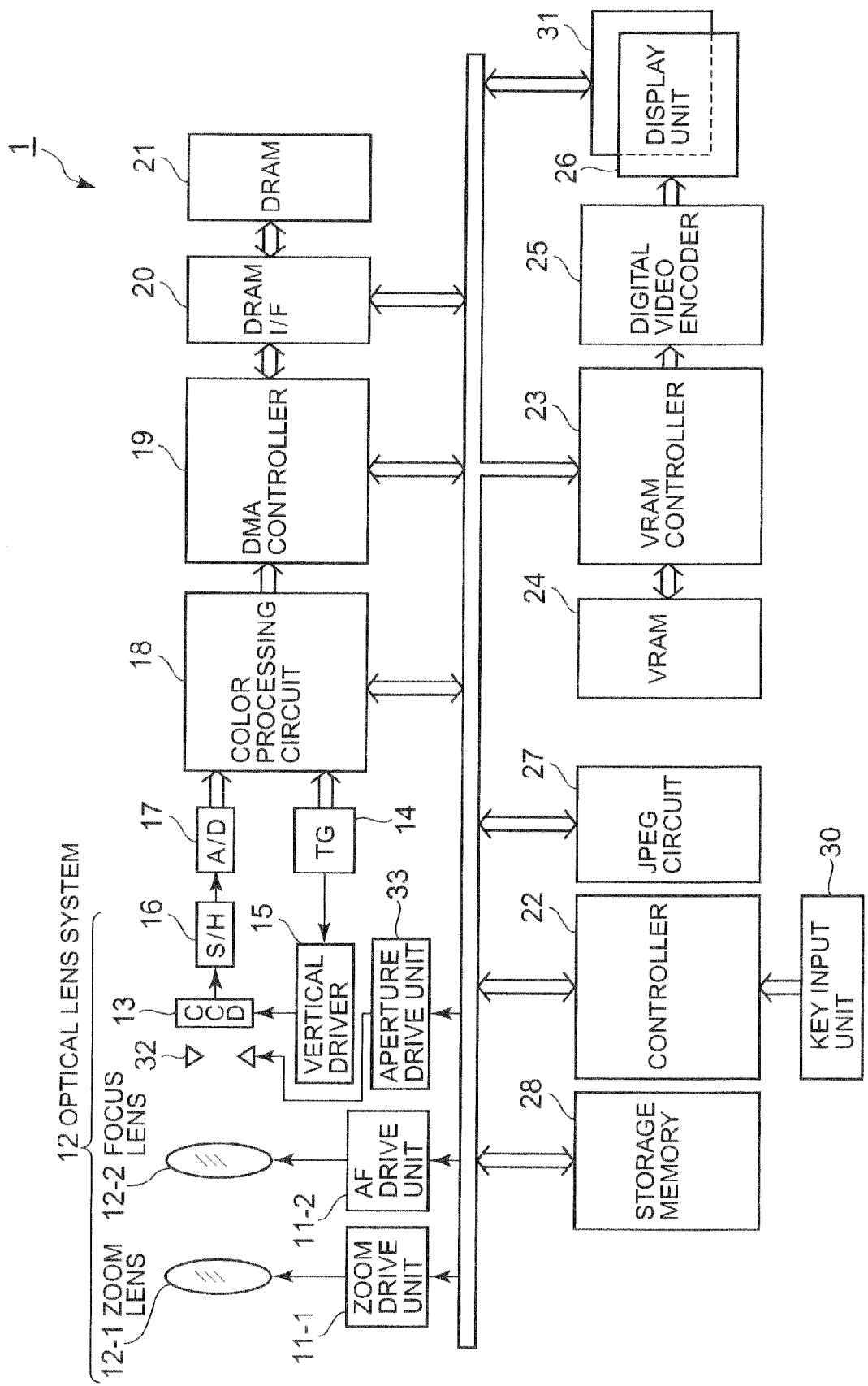
FIG. 1 is a diagram showing an electronic circuit structure of a digital camera according to an embodiment of the present invention.

Hereinafter, an embodiment of the present invention is described with reference to the diagrams. FIG. 1 is a diagram showing an electronic circuit structure of a digital camera 1 according to an embodiment of the present invention. This digital camera 1 includes a zoom drive unit 11-1 for causing a zoom lens 12-1 to move and perform an optical zoom action, and an AF drive unit 11-2 for causing a focus lens 12-2 to move and perform a focus action, in a photography mode, a lens optical system 12 constituting an imaging lens including the zoom lens 12-1 and the focus lens 12-2, an aperture 32 placed on an optical axis of the lens optical system 12, an aperture drive unit 33 for driving this aperture 32, a CCD 13 which is an imaging device, a timing generator (TG) 14, a vertical driver 15, a sample and hold circuit (S/H) 16, an analog-to-digital (A/D) converter 17, a color processing circuit 18, a DMA (Direct Memory Access) controller 19, a DRAM interface (I/F) 20, and DRAM 21. Furthermore, the digital camera 1 includes a controller 22, a VRAM controller 23, a VRAM 24, a digital video encoder 25, a display unit 26, a JPEG (Joint Photographic Coding Experts Group) circuit 27, and a storage memory 28, together with a key input unit 30.

In a monitoring state in the photography mode, the zoom drive unit 11-1, based on a control signal from the controller 22 when there is an optical zoom instruction, changes the magnification ratio of an image to be formed by the CCD 13 by driving the zoom lens drive motor, which is not shown, and thus causing the zoom lens 12-1 to move forwards and backwards along the optical axis Furthermore, the AF drive unit 11-2 drives the focus lens drive motor, which is not shown, to cause the focus lens 12-2 to move. In addition, the CCD 13, which is an imaging device placed backward along an optical axis of the lens optical system 12, is scan-driven by the timing generator 14 and the vertical driver 15, and outputs, for each fixed period, one frame worth of photoelectric conversion output corresponding to an optical image formed.

The CCD 13 is a solid-state imaging device that images a two dimensional image of a subject image, and typically takes images of several tens of frames per second. It should be noted that the imaging device is not limited to a CCD, and may de a solid-state imaging device such as a CMOS (Complementary Metal Oxide Semiconductor).

This photoelectric conversion output, after being suitably gain-adjusted for each primary color component of RGB in a signal state of analog value, is sample-held by the sample and hold circuit (S/H) 16, and converted by the A/D converter 17 to digital data (pixels). By the color processing circuit 18, color processing including pixel interpolation processing and gamma correction processing is carried out on the digital data, and a luminance signal Y and chrominance signals Cb and Cr of digital values are generated and output to the DMA (Direct Memory Access) controller 19.

The DMA controller 19 carries out a DMA transfer of the luminance signal Y and the chrominance signals Cb and Cr output by the color processing circuit 18, using a composite synchronizing signal, a memory write enable signal, and a clock signal from the same color processing circuit 18 via the DRAM interface (I/F) 20, to the DRAM 21 used as buffer memory.

The controller 22 controls the whole operations of the digital camera 1, and is constituted by a CPU or MPU, a program storage memory such as a flash memory that stores programs or The like for executing the processing shown in the flowchart described hereinafter, and a RAM or the like used as work memory. In addition, after completion of DMA transfer of the luminance signal and the chrominance signals to the DRAM 21, these luminance and chrominance signals are read out from the DRAM 21 via the DRAM Interface 20, and written into the VRAM 24 via the VRAM controller 23.

Furthermore, in response to the operation signal from the key input unit 30, the controller 22 extracts menu data or a processing program stored in the program storage memory such as a flash memory, and controls the operation of each function of the digital camera 1, more specifically, photography behavior, the operation of the zoom lens at a time of zooming, through image display (live view image, finder image), auto-focus, photography, recording, and the operation of playback and display of a recorded image, display of a function selection menu at a time of function selection, display of a configuration screen, and the like.

The digital video encoder 25 periodically reads out the luminance and chrominance signals from the VRAM 24 via the VRAM controller 23, generates a video signal based on these data, and outputs the video signal to the display unit 26. The display unit 26 functions as a monitor display unit (electronic finder) in the photography mode, and by performing display in response to the video signal from the digital video encoder 25, displays a through image in real-time based on image information read in from the VRAM controller 23 at that point.

Furthermore, the controller 22 performs the actual photographic processing in accordance with a photography instruction In this actual photographic processing, triggered by an operation or a shutter key of the key input unit 30, the controller 22 instructs the CCD 13, the vertical driver 15, the sample and hold circuit 16, the color processing circuit 18, and the DMA controller 19 to switch from a through image photography mode to a still image photography mode, and temporarily stores image data obtained through the photographic processing in this still image photography mode into the SDRAM 21.

Further, the controller 22 reads out one frame of luminance and chrominance signals written in the DRAM 21 via the DRAM interface 20, in units called "basic blocks" of 8 pixels high by 8 pixels wide for each of the Y, Cb, and Cr components, to be written to the JPEG circuit 27. This JPEG circuit 27 carries out data compression on the basic blocks by performing processing such as ADCT (Adaptive Discrete Cosine Transform) and Huffman coding, which is an entropy coding method, and the like. Then, the encoded data thus encoded is read out from the JPEG circuit 27 as a data file of one image, and is stored in the storage memory 28. Moreover, upon completion of compression processing of one frame of luminance and chrominance signals and writing of all the compressed data to the storage memory 28, the controller 22 instructs switching from the still image photography mode to the through image photography mode.

Moreover, in the playback mode, the controller 22 selectively reads out image data stored in the storage memory 28, uncompresses compressed image data in a completely opposite order from the data compression procedure carried out by the JPEG circuit 27 in the photography mode. The controller 22, upon extracting the uncompressed image data to the VRAM 24 via the VRAM controller 23, periodically reads out the image data from this VRAM 24, causes the digital video encoder 25 to generate a video signal based on these image data, and the display unit 26 to play back and output the video signal.

Furthermore, transparent touch panels 31 are stacked on the display unit 26. The touch panels 31 detect a touch position and input the detected touch position to the controller 22.

It should be noted that the "focus control" in the automatic configuration parameters to be described hereinafter is control in which the AF driver unit 11-2 drives the focus lens 12-2, and an "aperture" is control in which the aperture drive unit 33 drives the aperture 32. Furthermore, the "EV Shift Amount" is a value of change of a value representing an amount of light to expose according to a combination of the aperture 32 and the shutter speed. "Sensitivity" is processing to increase sensitivity by enhancing the gain for the CCD 13, and "shutter speed" is charge accumulating time of the CCD 13.

The JPEG circuit 2-7 can be used with a plurality of compression ratios, aid modes corresponding to high-resolution (commonly called "high-definition," "fine," "normal," and the like) of a low compression ratio, and low-resolution (commonly called "economy") of a high compression ratio are available. Furthermore, The JPEG circuit 27 can be used with a range from a high number to a low number of pixels. For example, such recording pixel sizes as SXGA (1600×1200), XGA (1024×768), SVGA (800×600), VGA (640×480), and QVGA (320×240) are available.

Storage memory 28 consists of storage media such as embedded memory (flash memory), a hard disk, or a removable memory card, and stores and records image data, photographic information, and the like.

A key input unit 30 is constituted by, for example, a mode dial, cursor keys, a SET key, zoom buttons (a W button and a T button), a shutter key, a clear key, a power button, and the like, and a key processing unit (not shown) which generates, when a key is operated, an operation signal corresponding to the key and sends the signal to the controller 22.

FIG. 2 is a diagram showing a photographic scene correspondence table 221 stored in the ROM in the controller 22 according to an embodiment of the present invention. In this photographic scene correspondence table 221, "icons" and "parameters" are stored according to "photographic scenes." For "photographic scenes," there are such photographic scenes determined according to processing to be described hereinafter as "person (male)," "person (female)," . . . , and "night scene." The "icon" is a graphic symbol mnemonically showing a determined photographic scene. Furthermore, as a "parameter," an optimal predetermined value for the photographic scene is stored.

It should be rioted that the parameters of FIG. 2 are to be used at a time of actual photography (in the still image photography mode), and during the through image photography mode, the parameters for the actual photography are artificially achieved by the image processing (software processing). Therefore, in the photographic scene correspondence table 221, image processing software corresponding to various parameters is stored, although not shown. Using this corresponding image processing software, the through image is image processed, and a through image artificially having attributes to be obtained at a time of the actual photography with the parameters is generated. More specifically, for example, in a case of the parameter "shutter speed," as the shutter speed slows down, image processing to increase a brightness of the through image will be performed by image processing.

Figure 3:
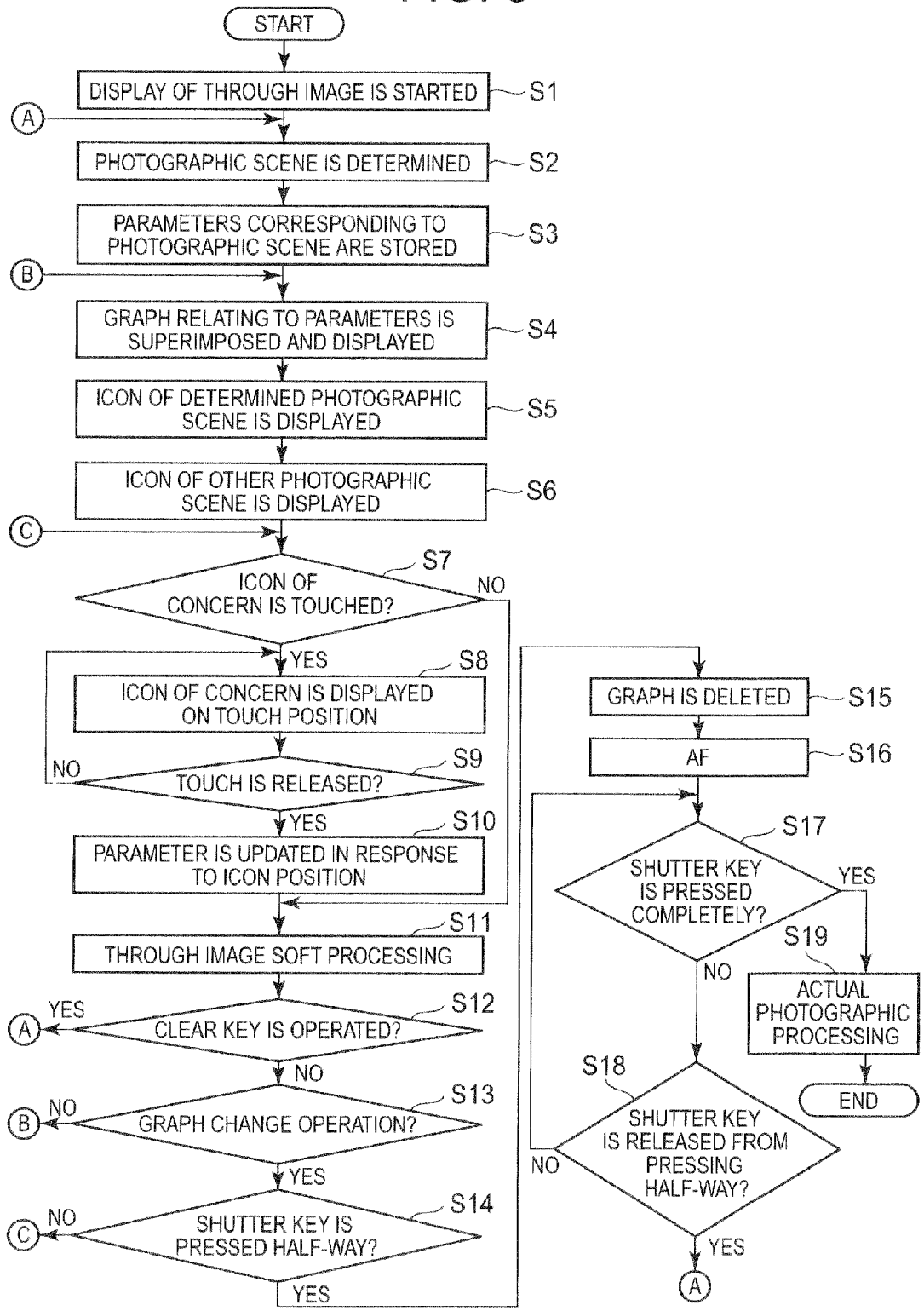
FIG. 3 is a flowchart showing a processing procedure according to the same embodiment.

In addition, by a user operating the mode dial of the key input unit 30 in order to perform photography, when the photography mode is set, and the "selectable automatic mode" is selected, the controller 22 performs such processing as shown in the flowchart of FIG. 3 in accordance with the program. First, display of a through image is started by the display unit 26 (Step S1) Next, when this through image is displayed, a photographic scene is determined based on an image of one frame sequentially transferred from the CCD 13 to the DRAM 21 (Step S2).

In this determination of the photographic scene, as disclosed in, for example, Japanese Unexamined Patent Application Publication No. 2008-11289, a distribution of hue data and chrome data on hue-chroma coordinates for each of the "photographic scenes" stored in the photographic scene correspondence table 221 is stored in the ROM, and by comparing the distribution of the hue data and chrome data for the image in the DRAM 21 with the distribution of each of the "photographic scenes," it is possible to determine to which "photographic scene" the photography image (the image in the DRAM 21) corresponds.

In addition, after the photographic scene is determined in this manner, parameters corresponding to the determined photographic scene are read out from the correspondence table 221, and stored in the RAM in the controller 22 (Step S3).

Figure 4:
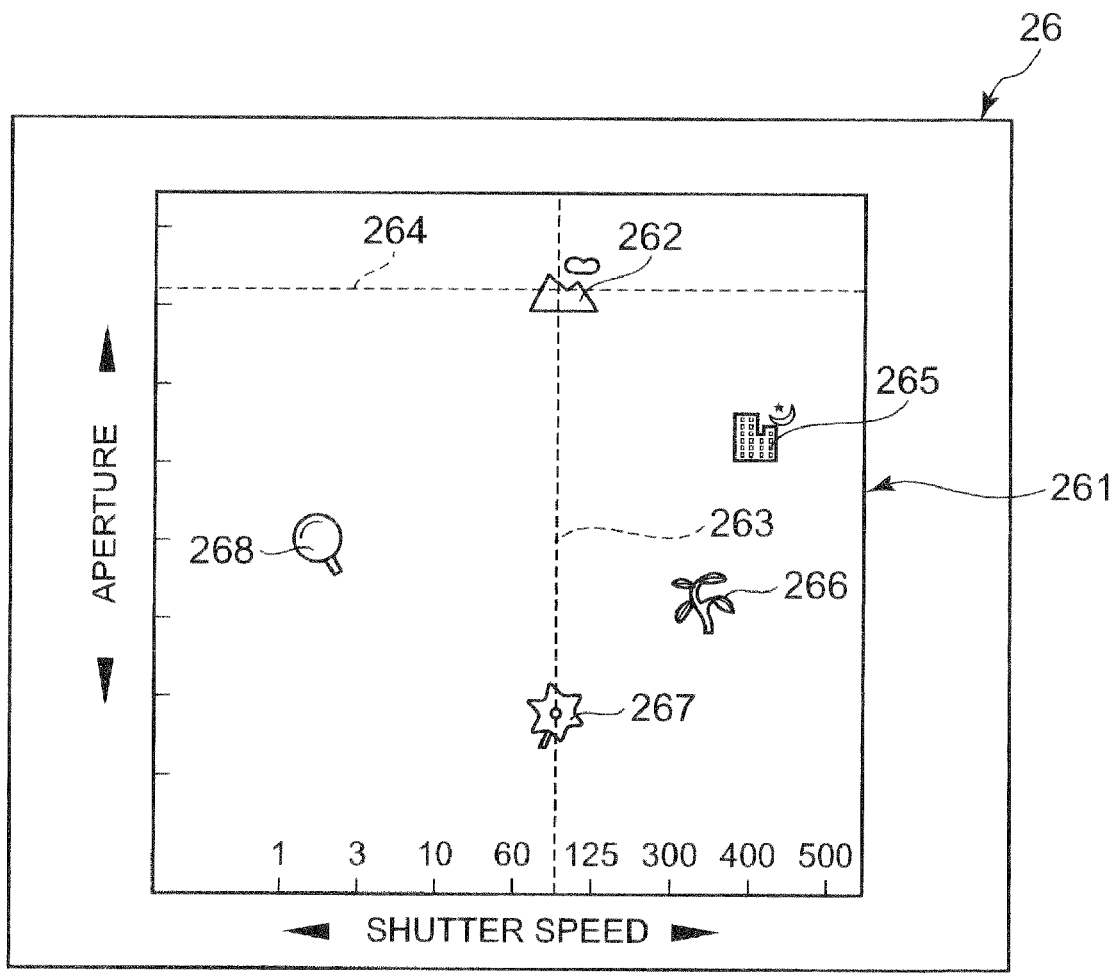
FIG. 4 is a diagram showing an example of a display screen according to the same embodiment.

Next, the graph relating to the parameters is superimposed on the through image, and displayed on the display unit 26 (Step S4). The graph displayed by processing of this Step S4, in the default state, is a two-dimensional graph in which "aperture" is set on the vertical axis, and "shutter speed" is set on the horizontal axis. Therefore, a graph 261 as shown in FIG. 4 is displayed as superimposed on the through image (not shown).

Next, on this displayed graph 261, at a position of the parameter value corresponding to the photographic scene determined in Step S2, an icon (hereinafter, called "the scene icon") of the photographic scene is displayed (Step S5). Therefore, supposing that the photographic scene determined in the Step S2 is "scenery," as shown in FIG. 4, a scenery icon 262 is displayed at a position on the graph 261 corresponding to the aperture value and the shutter speed which are stored as parameters for "scenery" of the photographic scene. At this time, on the graph 261 as shown, vertical and horizontal lines 263 and 264 intersecting perpendicularly with each other are displayed on the scenery icon 262.

By these displayed vertical and horizontal lines 263 and 264, it is possible for the user to recognize clearly that the values shown at the position of the scenery icon 262 are the aperture value and shutter speed in the recognized photographic scene.

Moreover, in this manner, without displaying the horizontal and vertical lines 263 and 264, it is also possible to clearly indicate that the icon 262 is the scene icon by setting the scene icon 262 alone in a different display appearance from the hereinafter described other icons 265 to 268. Moreover, it is also possible to have displayed on the graph only the scene icon 262 without displaying the other icons 265 to 268. In this case, it is possible to display an identifier (such as a number, symbol, figure, or mark) unrelated to the determined photographic scene, instead of the scene icon 262.

In addition, at a position of a corresponding value on the graph 261, an icon of a photographic scene other than the photographic scene determined at the Step S2 is displayed (Step S6). Therefore, by the processing of this Step S6, as shown in FIG. 4, other than the scene icon 262, a night scene icon 265, nature icon 266, flower icon 267, macro icon 268, and the like are displayed at positions on the graph 261 corresponding to the aperture values and shutter speeds stored as parameters.

Therefore, it is possible for the user to recognize and learn disparities between parameters of the recognized photographic scenes and parameters of other photographic scenes by verifying positions in the graph 261 of these icons 265 to 268 of other photographic scenes.

Figure 5:
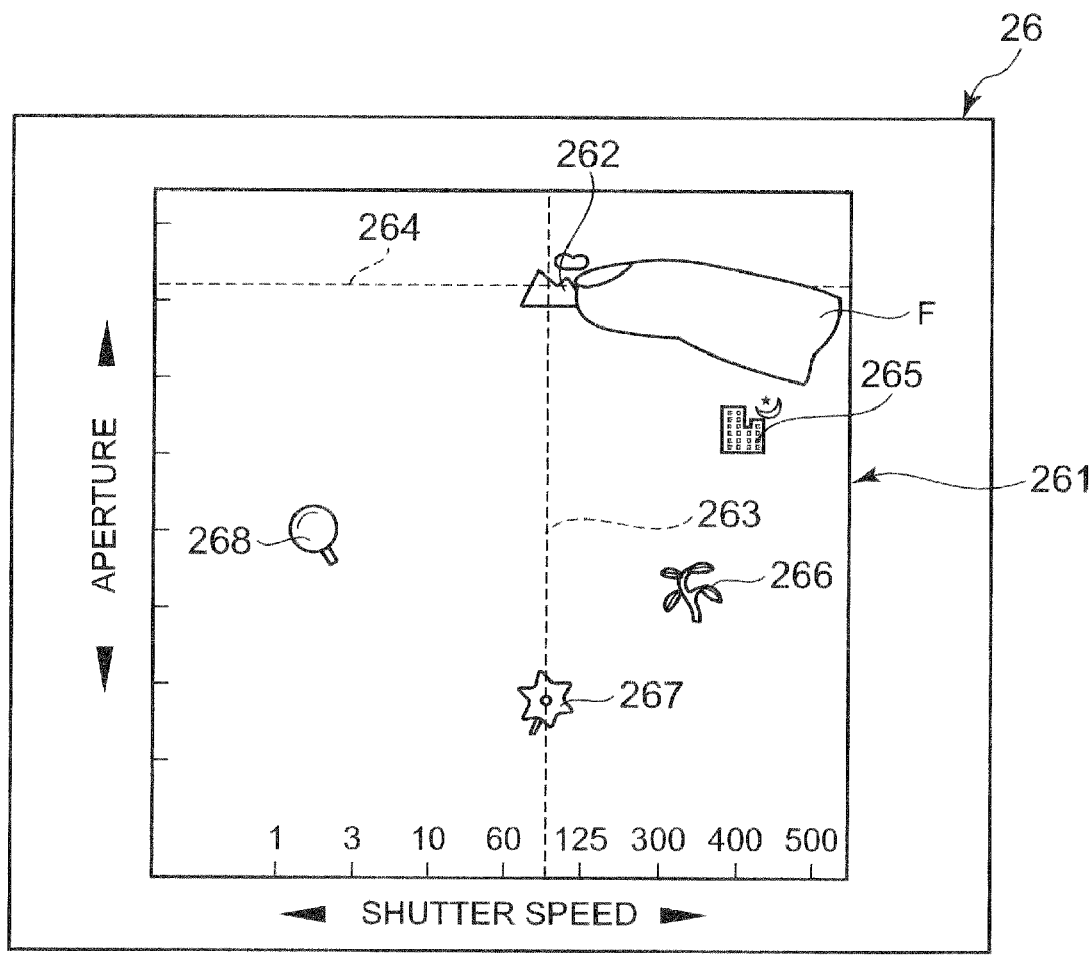
FIG. 5 is a display transition diagram following FIG. 4.
Figure 6:
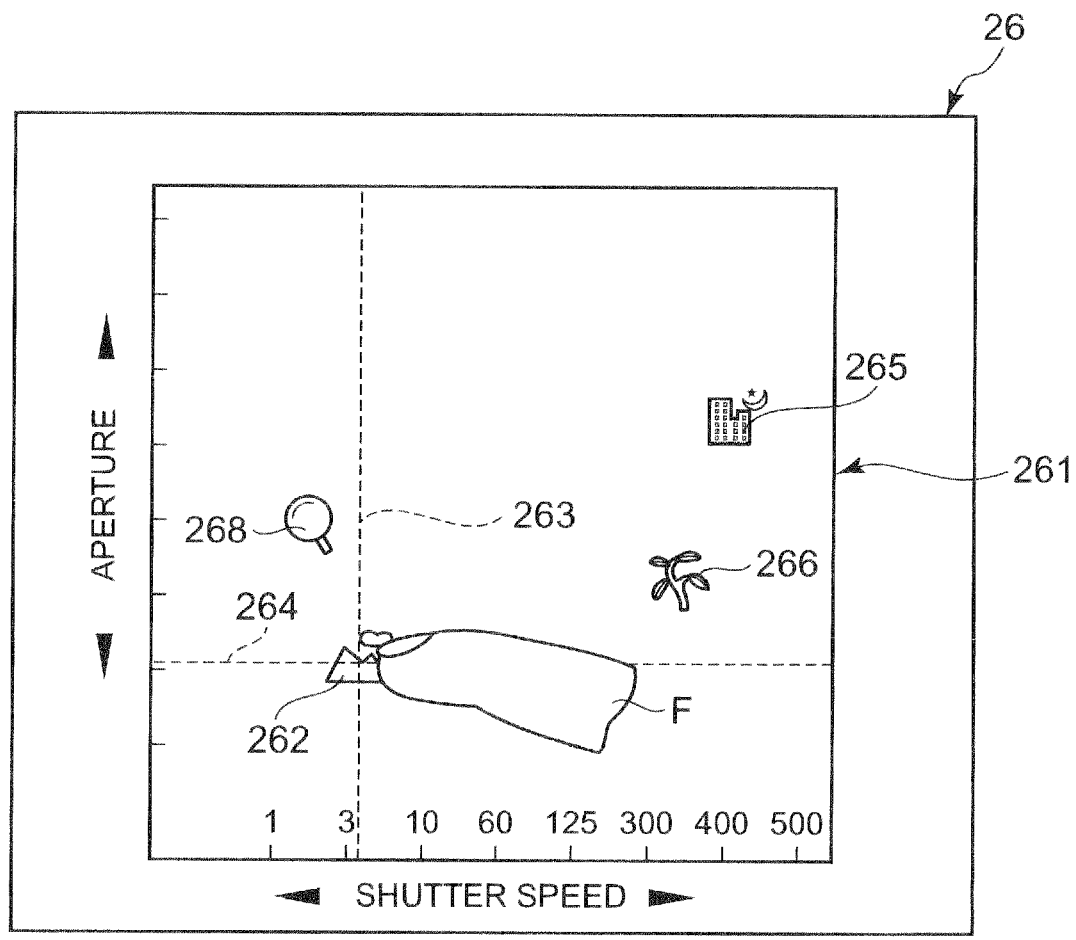
FIG. 6 is a display transition diagram following FIG. 5.

Next, based on detection information from the touch panel 31, it is determined whether the scene icon 262 has been touched (Step S7), and in a case of not being touched, Step S11 is proceeded to. In a case in which the scene icon has been touched, the control transitions to processing of displaying the scene icon 262 at the current touch position (Step S8). Therefore, by processing of this Step S8, as shown in FIG. 5, when the user touches the scene icon 262 with a finger F, and as shown in FIG. 6, the finger F is moved in a state of touching, the scene icon 262 is displayed as moving together with movement of the finger.

Figure 7:
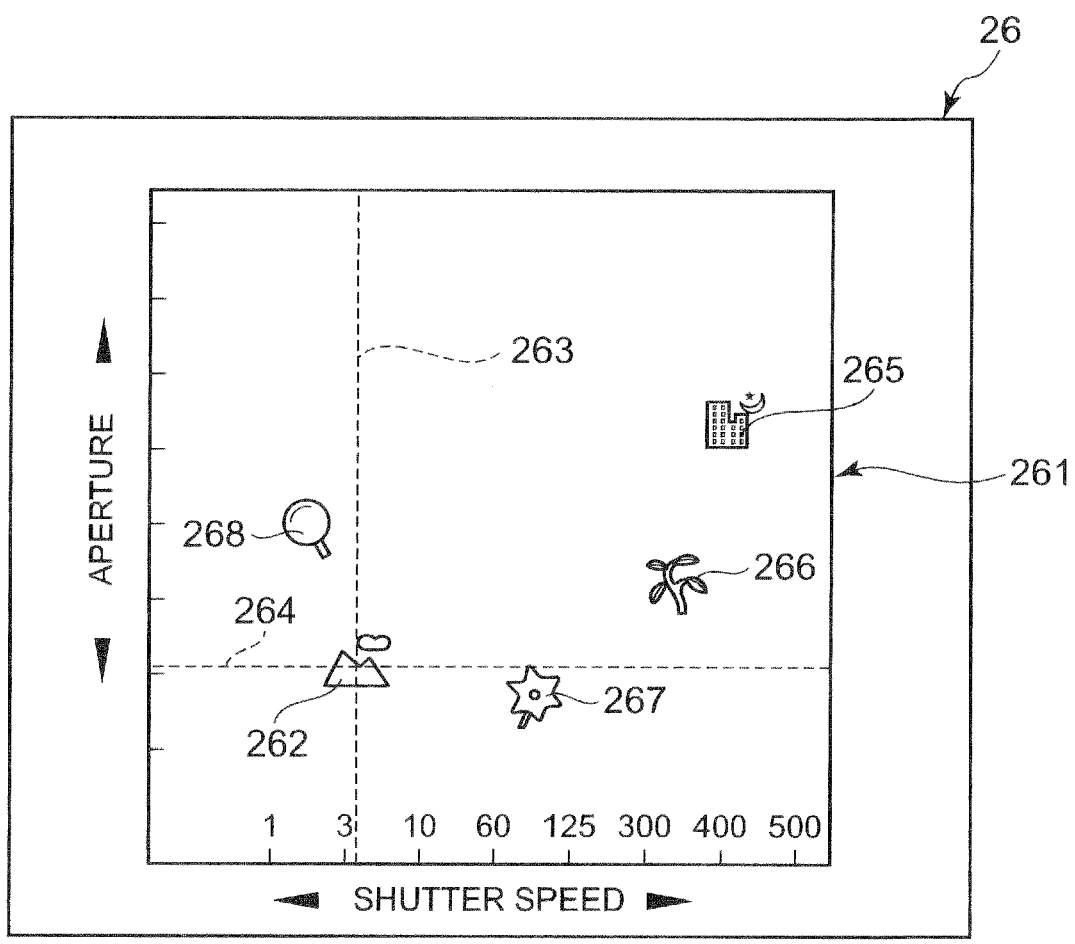
FIG. 7 is a display transition diagram following FIG. 6.

Subsequently, it is determined whether the touch to the scene icon 262 has been released, that is to say, whether the finger E has moved away from the scene icon 262 (Step 56), and the processing of Step S8 continues until the finger F moves away. Then, at the point where the finger F moves away (Step S9->YES), the next Step S10 is proceeded to without returning to Step S8. Therefore, when the finger F is moved away in the state of FIG. 6, as shown in FIG. 7, the scene icon 262 is displayed as stopping at the position at which the finger F is separated therefrom.

Then, based on the position of the scene icon 262 on the graph 261 on which the display has changed as above, the vertical axis and horizontal axis values of the graph 261 are read off, and the values corresponding to the parameters stored in the RAM in the controller 22 in Step S3 are updated (Step S10). Here, after the scene icon 262 is touched, in a case in which the finger F has separated therefrom without moving the finger F at all, the parameters stored in the RAN in the controller 22 in Step S3 are updated to identical values.

Therefore, the parameters of the photographic scene stored in the RAM in the controller 22 change according to the position on the graph 261 of the scene icon 262. At this time, the scene icon is displayed at a corresponding position on the graph 261, and therefore it is possible for the user to refer to the position on the graph 261 of the displayed scene icon 262 and easily manually set the photography conditions.

Then, in the following through image software processing, image processing is executed on the through image using the image processing software to artificially achieve the parameters stored in the RAN in the controller 22 (Step S11). Therefore, in a case in which there has been a movement operation of the scene icon 262 by the finger F of the user as described above, a through image artificially having attributes of the actual photography with the parameters updated in Step S10 is to be displayed on the display unit 26

Therefore, by the photographer visually recognizing this through image, it is possible to confirm and learn how the image changes by manual configuration of the parameters.

However, in a case in which there has been no touch to the scene icon 262, the processing of Step S10 is not executed, and therefore the parameters stored in the RAM of the controller 22 are, without being updated, maintained as they are in a state stored in Step S3. Therefore, in this case, a through image having attributes of actual photography artificially performed with automatically configured parameters is displayed on the display unit 26.

Next, it is determined whether the clear key of the key input unit 30 has been operated (Step S12), and in a case in which the clear key has been operated Step S2 is returned to. It should be noted that, in a case in which the setup is set to hold parameters corresponding to the photographic scene stored in Step S3 without updating and recording in Step S10, it is possible to cause the control to return to Step S4.

Furthermore, in a case in which the clear key is not operated, it is determined whether a graph change instruction operation has been performed by the key input unit 30 (Step S13). In a case in which the graph change instruction operation has been performed, Step S4 is returned to, a graph in which other parameters have been configured is superimposed on the through image and displayed by the display unit 26.

Figure 8:
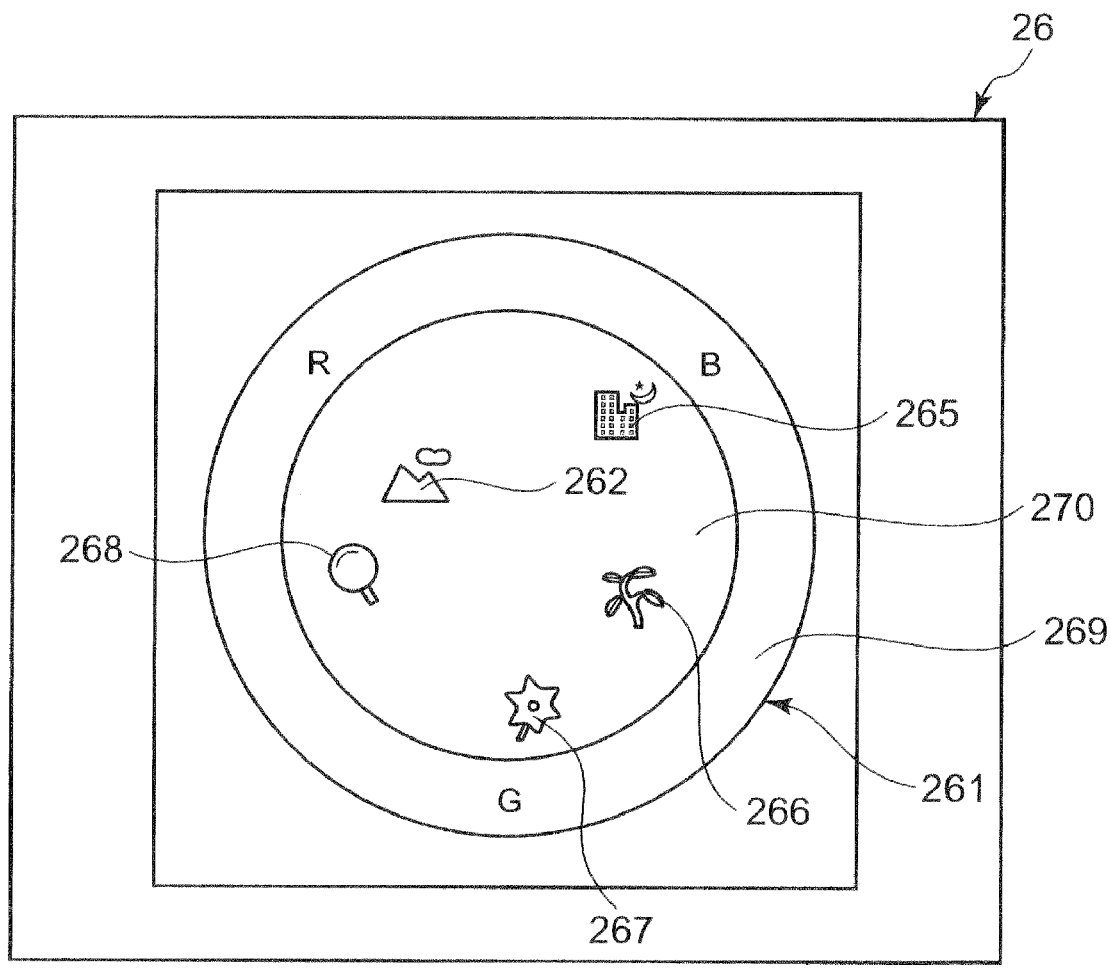
FIG. 8 is a diagram showing an example of a graph of white balance.
Figure 9:
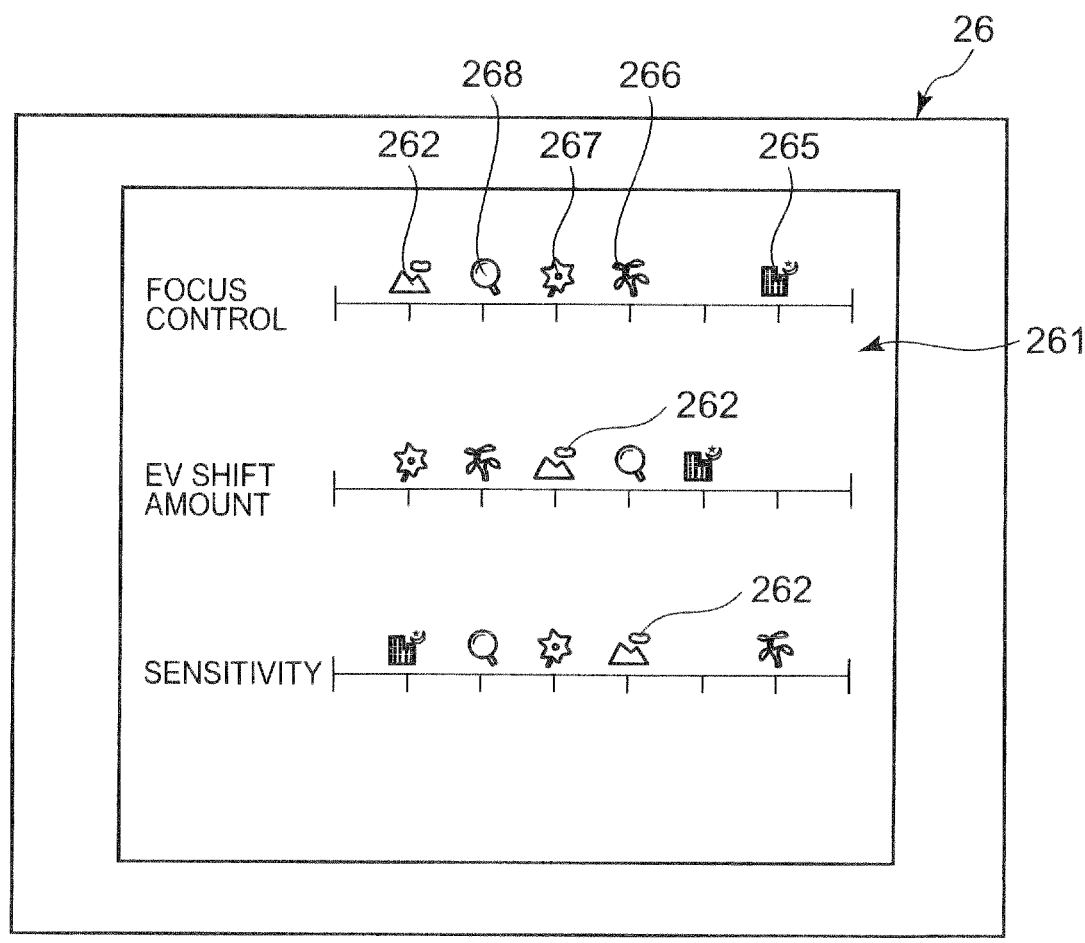
FIG. 9 is a diagram showing an example of graphs of focus control, EV shift amount, and sensitivity.

Here, graphs in which the other parameters have been configured differ according to the parameters, as shown by the examples in FIGS. 8 and 9. That is to say, FIG. 8 is a diagram showing an example of a graph in a case in which the parameter is for white balance. As shown, "R (Red)," "G (Green)," and "B (Blue)" letters are displayed at uniformly spaced positions on a ring portion 269, while white balance is represented by a position of the scene icon 262 displayed in a circle portion on the ring portion 269.

FIG. 9 is, for example, an example of bar graph representations of a plurality of parameters different from one another, and values of respective parameters are shown by the scene icon 262 on respective bar graphs.

That is to say, the graph to be displayed in Step S4 may be any graph, not limited to a one-dimensional graph or a two-dimensional graph, but even such as a three-dimensional graph, and the graph may be of any display appearance so long as the parameters can be visually confirmed.

In addition, in a case in which it is determined in Step S13 that there has not been any graph change instruction operation, it is determined whether the shutter key has been operated by pressing half-way (Step S14), and in a case in which the shutter key has not been operated by pressing half-way, Step S7 is returned to. If the shutter key has been operated by pressing half-way, the graph 261 displayed on the display unit 26 at the present time is deleted (Step S15).

Therefore, by the user performing an operation of pressing the shutter key half-way, it is possible to confirm the subject image on the display unit 26, on which the graph 261 has not been superimposed, clearly.

Next, based on the parameter for focus control from among the parameters stored in the RAM in the controller 22, AF processing is executed (Step S16), and it is determined whether the shutter key has been completely pressed (Step S17).

In a case of not having been completely pressed, it is determined whether the half-way pressing of the shutter key has been released (Step S18), and in a case in which the half-way pressing of the shutter key has been released, Step S2 is returned to. Moreover, it is possible to return to Step S4 in this case.

In addition, if the shutter key has been completely pressed, Step S19 is proceeded to from Step S11, and the actual photographic processing described above is executed. That is to say, the controller 22 instructs switching from the through image photography mode to the still image photography mode triggered by an operation of the shutter key, performs photographic processing with parameters stored in the RAM of the controller 22 in this still image photography mode, and after temporarily storing image data obtained by this photographic processing in the SDRAM 21, stores thereof in the storage memory 28 (Step S19).

At this time, if the user has even once performed an operation of completely pressing the shutter key after touching and moving the scene icon 262, the actual photographic processing described above is to be executed with the parameters stored in the RAM in the controller 22 in Step S10 as photography conditions. That is to say, the controller 22 instructs switching from the through image photography mode to the still image photography mode triggered by an operation of the shutter key, performs photographic processing with the parameters that have been updated and stored in the RAM of the controller 22 in Step S10 in this still image photography mode, and after temporarily storing image data obtained by this photographic processing in the SDRAM 21, stores thereof in the storage memory 28 (Step S18).

In the photograph image data stored in this storage memory 28, one portion has been manually configured by an operation of the photographer after the photography conditions were fully automatically configured. Therefore, it is possible to resolve the disadvantage of the user being inconvenienced by a configuration operation of the photography conditions while setting the photography conditions to be those reflecting the intention of the user.

However, in a case in which the user has performed an operation of completely pressing the shutter key without even once touching or moving the scene icon 262, the actual photographic processing is to be executed with the parameters stored in the RAM in the controller 22 in Step S3 as photography conditions. Therefore, in this case, for the photograph image data recorded in the storage memory 28, the photography conditions have been fully automatically configured. Thus, it is possible for the user to perform fully automatic photography by an operation of completely pressing the shutter key without touching and moving the scene icon 262.

It should be noted that, in the present embodiment, although image processing artificially achieving parameters stored in RAM in the controller 22 is set to be executed for the through image in Step S11, it is possible to perform ordinary through image display without performing this kind of image processing for the through image.

In addition, in the present embodiment, although the invention is described with an example of a case applied to a digital camera, it is possible to apply thereof not only to a digital camera, but to a device including a function to record imported image data through an optical system and an imaging device, for example, a mobile phone with a camera or an electronic apparatus including an imaging function.

What is claimed is:

1. A camera comprising:
   a determination unit that determines a photographic scene based on a photographed subject image; and
   a display unit that displays a graph relating to photography conditions, and displays a predetermined identifier at a position on the graph corresponding to photography conditions that correspond to the photographic scene determined by the determination unit;
   wherein the display unit includes an operation unit that moves the predetermined identifier on the graph according to an operation of a user; and
   wherein the camera includes a manual adjustment unit that adjusts the photography conditions corresponding to the photographic scene determined by the determination unit, based on a position on the graph of the predetermined identifier after the predetermined identifier is moved by the operation unit.

2. A camera according to claim 1, further comprising a position detection unit that detects the position on the graph of the predetermined identifier moved by the operation unit;
   wherein the manual adjustment unit adjusts the photography conditions corresponding to the photographic scene determined by the determination unit, based on the position on the graph detected by the position detection unit.

3. A camera according to claim 1, further comprising:
   an image processing unit that image-processes the photographed subject image in accordance with the photography conditions adjusted by the manual adjustment unit;
   wherein the display unit displays, as a through image, the subject image image-processed by the image processing unit superimposed on the graph.

4. A camera according to claim 3, further comprising:
   a motion detection unit that detects a start of a photography preparation operation of a user;
   wherein the display unit deletes the display of the graph when the photography preparation operation of a user is detected by the motion detection unit.

5. A camera according to claim 1, wherein the graph is a two-dimensional graph; and
   wherein the display unit further displays a vertical line and a horizontal line intersecting perpendicularly on the predetermined identifier on the two-dimensional graph.

6. A camera according to claim 1, further comprising a photography unit that carries out photography under photography conditions adjusted by the manual adjustment unit or under photography conditions according to the photographic scene determined by the determination unit.

7. A camera according to claim 1, wherein the predetermined identifier is a photography mode icon corresponding to the photographic scene determined by the determination unit;
   wherein the display unit also displays a photography mode icon that corresponds to a photographic scene other than the photographic scene determined by the determination unit, at a corresponding position on the graph; and
   wherein the display unit displays the photography mode icon corresponding to the photographic scene determined by the determination unit with a display appearance that is different from a display appearance of the photography mode icon corresponding to the photographic scene other than the photographic scene determined by the determination unit.

8. A non-transitory computer-readable storage medium having stored therein a camera control program that causes a computer included in a camera to function as units including:
   a determination unit that determines a photographic scene based on a photographed subject image;
   a display unit that displays a graph relating to photography conditions, and displays a predetermined identifier at a position on the graph corresponding to photography conditions that correspond to the photographic scene determined by the determination unit; and
   a manual adjustment unit that adjusts the photography conditions corresponding to the photographic scene determined by the determination unit, based on a position on the graph of the predetermined identifier after the predetermined identifier is moved by an operation unit that moves the predetermined identifier on the graph according to an operation of a user.

9. A camera control method comprising:
   determining a photographic scene based on a photographed subject image;
   displaying, by a display unit, a graph relating to photography conditions, and displaying a predetermined identifier at a position on the graph corresponding to photography conditions that correspond to the determined photographic scene; and
   adjusting the photography conditions corresponding to the determined photographic scene, based on a position on the graph of the predetermined identifier after the predetermined identifier is moved by an operation unit that moves the predetermined identifier on the graph according to an operation of a user.

* * * * *